Dec. 29, 1925
1,567,302
R. R. SEARLES
VEHICLE SPRING BEARING
Filed March 10, 1925
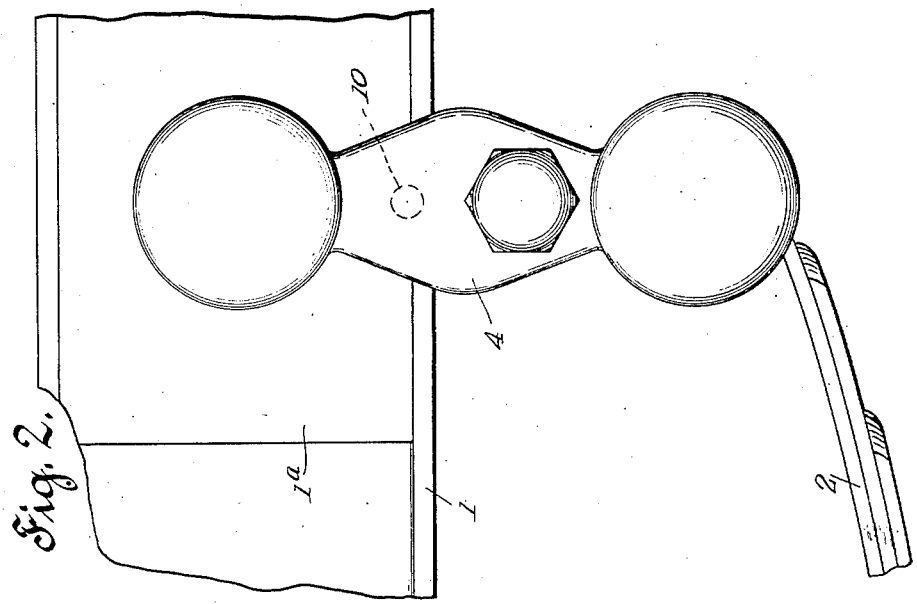
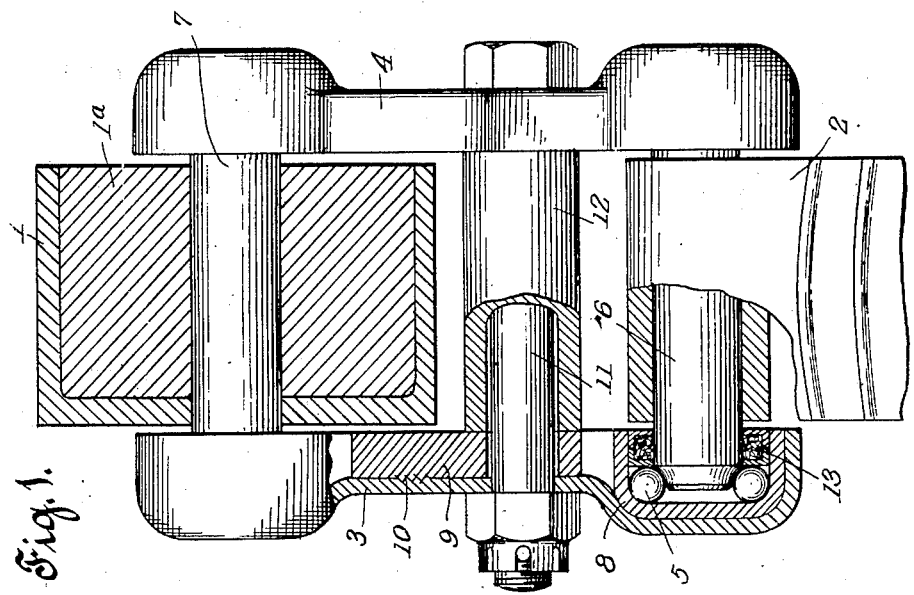
INVENTOR
R. R. Searles
BY
Mitchell Bechert
ATTORNEYS Patented Dec. 29, 1925.

1,567,302

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

VEHICLE SPRING BEARING.

Application filed March 10, 1925. Serial No. 14,393.

*To all whom it may concern:*

Be it known that I, RAYMOND R. SEARLES, a citizen of the United States of America, residing at New Britain, Connecticut, have invented a new and useful Vehicle Spring Bearing, of which the following is a specification.

The invention relates to improvements in anti-friction bearing connections for vehicle springs, and is particularly adapted for heavy vehicles, such as motor trucks.

It is an object of the invention to provide a bearing which may be applied directly to the sill of a vehicle, to afford greater facility in attaching the spring to the vehicle frame than is ordinarily possible where depending brackets are attached to the vehicle sill for the purpose of spring connection.

It is another object to provide shackle links which will be exceedingly strong, yet cheap to manufacture.

In the accompanying drawings, illustrating a preferred form of the invention—

Fig. 1 is an end elevation, partly in section, showing such parts as are essential to a full understanding of the invention;

Fig. 2 is a side elevation of the parts shown in Fig. 1.

1 represents in cross-section a channel beam, which constitutes one so-called side sill of a vehicle frame. 2 represents one end of a vehicle spring, which it is necessary to properly secure to said sill. In order to afford a minimum of clearance so as to allow the vehicle body to be positioned as low as possible, it is my purpose to dispense with the usual depending bracket, such as is ordinarily attached to the sill, and to connect the spring to the sill very closely. The connecting elements proper comprise two complementary shackle links 3—4, preferably formed from struck-up metal, so that the middle portion of each link is in the form of a channel, both ends of each link being provided with bearing surfaces, to receive or coact with anti-friction devices, such as balls 5. In the particular form shown 6 is a pin, which is mounted in the end of the spring 2. The ends of said pin project beyond the side edges of the spring sufficiently far to engage with and be supported by the balls 5—5. A similar pin 7 is mounted in the sill 1, a suitable fillet piece 1ª being mounted in the channel of the sill so as to properly support the pin 7 against tilting. The ends of the pin 7 may be supported by anti-friction devices at the upper ends of the links in a manner similar to that already described in connection with the lower ends thereof. The bearing surfaces for the balls at the link ends may be formed in any suitable way, for example, by separate bearing cups 8 of suitably tempered steel, which cups may be inserted in the link ends to carry the devices 5.

9 represents a reinforcing fillet, which is adapted to be secured in any suitable manner in the channel part of each link. This fillet may be secured in place in any desired way, as, for example, by spot welding, conventionally indicated at 10. 11 is a bolt which passes through appropriate passages or apertures in the links 3—4 for the purpose of holding them in operative position. In order to attain the greatest compactness, so that excessive clearance may be avoided, it is desirable in some cases to have the bolt 10 pass through the shackles 3—4 closer to the lower than to the upper ends thereof, as indicated in the drawing. This is particularly true where the upper ends of the shackle links are to be secured directly to the vehicle sill, instead of to a bracket. To that end it is desirable to have the channeled portion of each of the links reinforced, so that a tubular spacer 12, bearing against the reinforces 9 of the links, will properly steady and hold the links in parallel alignment when tightly clamped together by the through bolt 11. Manifestly, if the through bolt does not pass through the center of the links, the tendency of the same, when drawn up, would be to clamp the lower ends of the links more tightly on the bearing balls 5 than the upper ends; therefore, to avoid this, I have so constructed the parts that, even through the through bolt is not located midway in the length of the links, the latter will nevertheless be held positively in parallelism, so that strain on the anti-friction bearings at all four points will be substantially equalized.

While I have shown the invention in its preferred form, I am aware that modifications may be made with relation to details of construction without departing from the spirit and scope of the invention. I have not described in detail the minor features, one of which, for example, relates to a dust-proof washer, indicated in section at 13. It is, of course, preferable to provide suitable dust-proofing means at various points to protect the working parts of the anti-friction bearings, and the device indicated at 13 conventionally represents one form of such a means.

It is likewise plain that the particular form of the anti-friction bearing which is provided at each end of each link may be modified in a variety of ways.

I claim:

1. In a vehicle spring bearing, a pair of shackle links having bearing surfaces at the ends, shackle pins, anti-friction bearing members between said bearing surfaces and said pins, and means for holding said links together with the anti-friction bearing members engaging said pins and bearing surfaces, said holding means being positioned substantially farther from one end of said links than from the other end.

2. In the combination defined in claim 1, said holding means being a through bolt extending through said links.

3. In the combination defined in claim 1, and a spacer member for spacing said shackle links apart.

4. As an article of manufacture, a shackle link including a channel-shaped member having bearing surfaces at the ends for anti-friction bearing members, and a reinforcing member in said channel for strengthening the part of said channel-shaped member intermediate the ends.

5. As an article of manufacture, a shackle link including a link member formed of sheet metal and having bearing surfaces for anti-friction members at the ends thereof, and a reinforcing member extending longitudinally of said link and secured thereto at a point intermediate the ends of the link member.

6. In a vehicle spring bearing, a pair of shackle links having bearing surfaces at the ends, shackle pins, anti-friction bearing members between said pins and bearing surfaces, said links intermediate the ends being channel shaped, a reinforcing member in each channel, a spacer interposed between said channels for spacing said links apart, and means for holding said links to each other.

RAYMOND R. SEARLES.